Oct. 6, 1925.

J. H. ROGERS 1,556,354

ACCOUNT STATEMENT FORM

Filed Jan. 16, 1925    2 Sheets-Sheet 1

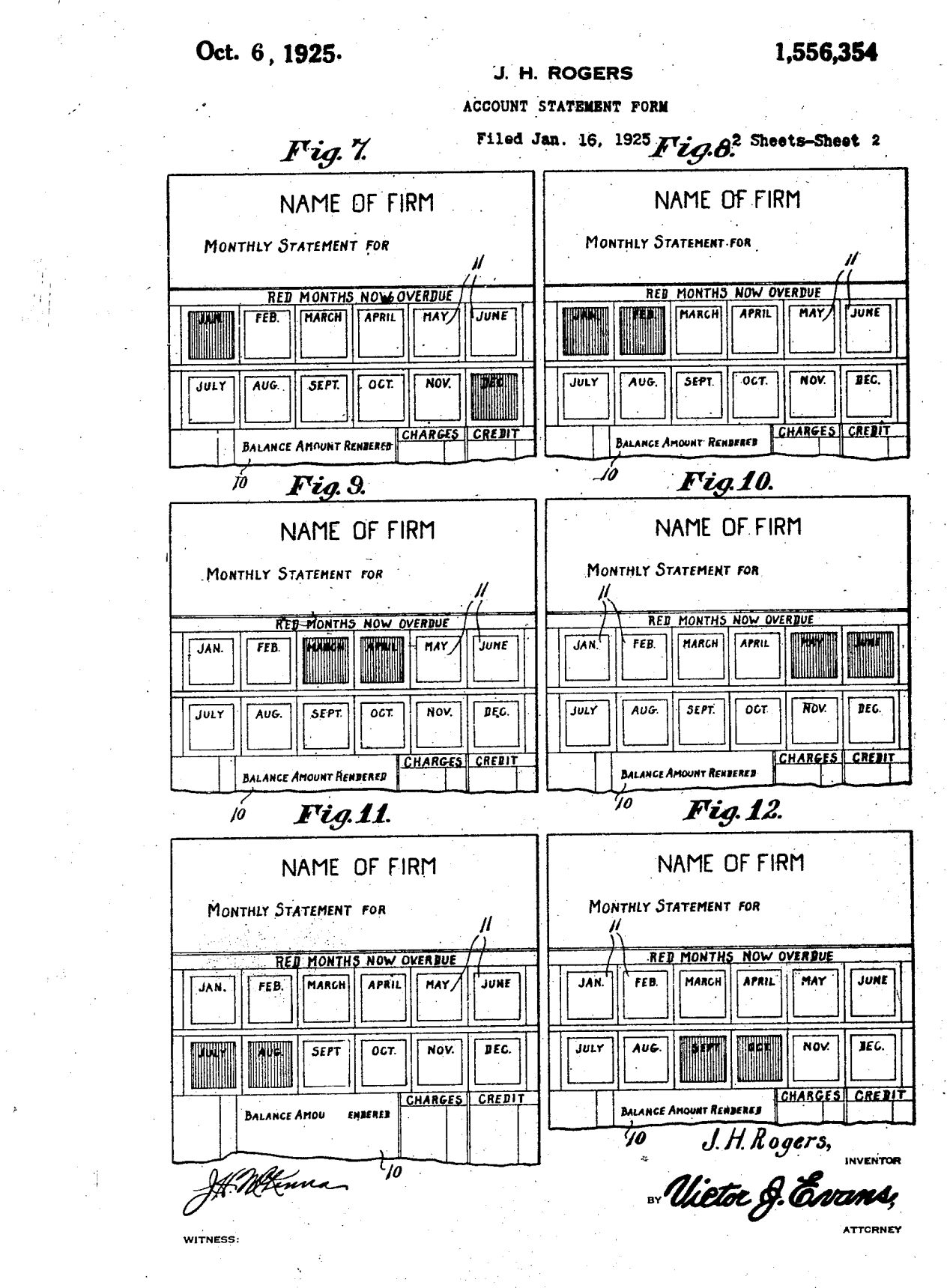

Oct. 6, 1925.   1,556,354
J. H. ROGERS
ACCOUNT STATEMENT FORM
Filed Jan. 16, 1925   2 Sheets-Sheet 2

Patented Oct. 6, 1925.

1,556,354

UNITED STATES PATENT OFFICE.

JAMES HENRY ROGERS, OF QUINCY, MASSACHUSETTS.

ACCOUNT-STATEMENT FORM.

Application filed January 16, 1925. Serial No. 2,888.

*To all whom it may concern:*

Be it known that I, JAMES H. ROGERS, a citizen of the United States, residing at Quincy, in the county of Norfolk and State of Massachusetts, have invented new and useful Improvements in Account-Statement Forms, of which the following is a specification.

The object of the invention is to provide a simple bill head or account statement form such as may be used by merchants which is so arranged as to call immediate and impressive attention to any overdue account or to any overdue portion of an account of the customer with the dealer or merchant, as an assistance to the merchant in making prompt collections of account from his customers, and also as a means of reminding a careless or thoughtless or otherwise delinquent customer in such a way as to prompt early settlement, without causing offense, and to this end the invention consists in a device of which a preferred form is shown in the accompanying drawing, wherein:

Figure 1 represents a bill head or account form having a plurality of spaces consecutively designated to represent calendar periods such as month periods.

Figures 2 to 6 inclusive represent account or statement forms in which different account spaces are distinguishably designated by color to represent overdue accounts.

Figures 7 to 12 inclusive represent account or statement forms in which two series of the calendar spaces are distinguishably designated as by color to indicate overdue accounts.

The form consists essentially of a sheet which has the usual heading of the firm or house using the same, and a body portion or space 10 for receiving an itemized account such as indicated in Figure 1, while preferably arranged conspicuously across the sheet at an intermediate point above the space 10 for the itemized statement, is a series of spaces 11 which are consecutively designated by the names of the months from January to December inclusive. According to the date of the statement which is being rendered by the dealer or merchant to his customer, the current month space 11 is designed to receive or to have written therein the amount of the current bill as shown by the sub-joined itemized statement, while if there is any balance left over from a previous month, the amount of that balance should be written in the month or calendar space corresponding with the previous month or with the month from which the balance has been carried. This obviously will indicate at a glance to the customer that while the bill or account for the current month is in accordance with the amount entered in the space corresponding with the date of the bill, the difference designated by the entry of the amount therein is carried forward as a balance overdue from a previous month, and the statement will also indicate by the space in which this overdue amount is entered, the previous month or the month in arrears, from which said amount has been carried.

In the forms of the invention illustrated in Figures 2 to 6 inclusive, the month space preceding that in which the account is rendered or the current month as it may properly be termed, is distinguishably designated with reference to the other month spaces, as by printing it or coloring it red, so that the overdue amount entered thereon as indicated in said Figures 2 to 6 inclusive will show at a glance that there is an overdue amount from a previous month, or that there is an amount in arrears with reference to the current month, while the current month space which for example is white will show the total amount of the bill for the current month. However, as shown in Figures 7 to 12 inclusive the table or series of spaces for the reception of the quotas for the several months including the current month, may have two or more distinguishably designated as by being colored red, so that amounts carried forward from two consecutive months in arrears may be indicated thereon, to show to the customer not only the amount of his current bill or the bill for the current month, but also the amount overdue from the preceding two months which are in arrears and therefore should receive immediate attention.

The device is designed as above indicated to call the attention of the customer to the fact not only that the bill is due, but that certain portions of the gross amount due are overdue for one or more months or calendar periods, and therefore require special attention, the distinguishable designation of the spaces in which these amounts in arrears are entered, serving as means of attracting attention of the customer to these overdue accounts, without necessitating any special mention thereof upon the part of the dealer or merchant.

Obviously in the use of these devices the merchant or dealer should be supplied with a full set which includes a form such as that indicated in Figure 1 in which the spaces are designated consecutively, but in which there is no special distinguishably designated calendar space, this form being used where there is no amount in arrears and the complete account is current; a series of 12 forms, of which only 5 are indicated in Figures 2 to 6 inclusive in which each month successively from January to December is distinguishably designated as by being printed in red or other readily noted color to distinguish it from the color of the other month or calendar spaces; and a further series of forms, of which there are twelve such as indicated in Figures 7 to 12 inclusive in which two consecutive months are distinguishably designated in groups as for example January and February, February and March, March and April, and so on throughout the series and including December and January. In this way one of the forms will be adapted for the use of the merchant or dealer in sending out statements or accounts at the end of any or during any calendar month of the year and will insure his having a plain or white space to receive the amount of the current bill or account and one or more distinguishably designated spaces representing preceding periods or months in which to indicate the amount of accounts overdue for one or more months.

What is claimed is:—

1. A bill head or statement form having a plurality of spaces consecutively designated to represent calendar periods for the reception of summaries of monthly accounts.

2. A bill head or statement form having a plurality of spaces consecutively designated to represent calendar periods for the reception of summaries of monthly accounts, some of said spaces being distinguishably designated to indicate periods in arrears of the current period.

3. A set of bill head or statement forms each having a plurality of spaces consecutively designated to represent calendar periods, for the reception of summaries of monthly accounts, and each of the sets having a plurality of consecutive spaces differently designated in a color distinguishable from the other spaces.

In testimony whereof I affix my signature.

JAMES HENRY ROGERS.